US007093829B2

(12) United States Patent
Fredrickson et al.

(10) Patent No.: US 7,093,829 B2
(45) Date of Patent: *Aug. 22, 2006

(54) AUTOMATIC TRUSS JIG SETTING SYSTEM

(75) Inventors: Clyde R. Fredrickson, Britton, SD (US); Mark Wismer, Britton, SD (US)

(73) Assignee: Truss Industry Production Systems, Britton, SD (US)

(*) Notice: Subject to any disclaimer, the term of this patent is extended or adjusted under 35 U.S.C. 154(b) by 0 days.

This patent is subject to a terminal disclaimer.

(21) Appl. No.: 11/286,639

(22) Filed: Nov. 23, 2005

(65) Prior Publication Data

US 2006/0061028 A1 Mar. 23, 2006

Related U.S. Application Data

(63) Continuation of application No. 11/139,937, filed on May 27, 2005, which is a continuation of application No. 10/780,477, filed on Feb. 17, 2004, now Pat. No. 6,899,324, which is a continuation of application No. 10/369,038, filed on Feb. 18, 2003, now Pat. No. 6,712,347.

(51) Int. Cl.
*B30B 3/02* (2006.01)

(52) U.S. Cl. ..................................... 269/37

(58) Field of Classification Search ........... 269/37, 269/43, 304, 40, 910, 303, 99, 225, 251; 29/281.3, 281.5; 100/913, 295, 100; 227/152, 227/154, 155
See application file for complete search history.

(56) References Cited

U.S. PATENT DOCUMENTS

| | | | |
|---|---|---|---|
| 2,680,287 A | 6/1954 | Wilson | |
| 3,319,323 A | 5/1967 | Groath | |
| 3,629,931 A | 12/1971 | Stanely | |
| 3,734,376 A | 5/1973 | Abernathy | |
| 3,767,100 A | 10/1973 | Davis | |
| 3,811,167 A | 5/1974 | Schneider | |
| 3,896,717 A | 7/1975 | Schmitt | |
| 4,516,675 A | 5/1985 | Koskovich | |
| 4,669,184 A | 6/1987 | Castillo | |
| 4,943,038 A | 7/1990 | Harnden | |
| 4,953,839 A * | 9/1990 | Chern | 269/222 |
| 5,092,028 A | 3/1992 | Harden | |

(Continued)

OTHER PUBLICATIONS

The Koskovich Company, Automated Truss Jigging System.

(Continued)

*Primary Examiner*—Robert C. Watson
(74) *Attorney, Agent, or Firm*—Woods Fuller Shultz & Smith PC; Jeffrey A. Proehl

(57) ABSTRACT

A automatic truss jig setting system is disclosed that includes a table including a plurality of segments with a side edge of adjacent segments defining a slot. At least one pin assembly, and optionally a pair of pin assemblies, is movable independently of each other along the slot. Movement apparatus is provided for independently moving the pin assemblies along the slot. Each of the side edges of the segments associated with the slot defines a substantially vertical plane with a zone being defined between the substantially vertical planes of the side edges, and the movement apparatus is located substantially outside of the zone of the slot. The invention may optionally include a system for handling the obstruction of pin assembly movement, and a system for keeping track of the position of the pin assembly when the pin assembly has encountered an obstruction.

13 Claims, 8 Drawing Sheets

U.S. PATENT DOCUMENTS

| | | |
|---|---|---|
| 5,342,030 A | 8/1994 | Taylor |
| 5,702,095 A | 12/1997 | Williams |
| 5,854,747 A | 12/1998 | Fairlie |
| 5,947,460 A | 9/1999 | Williams |
| 6,155,549 A | 12/2000 | Burcaw |
| 6,260,263 B1 | 7/2001 | Haase |
| 6,317,980 B1 | 11/2001 | Buck, III |

OTHER PUBLICATIONS

Alpine Engineered Products, Inc., Auto Set C.

Alpine Engineered Products, Inc., Trusset Jigging System.

* cited by examiner

AUTOMATIC TRUSS JIG SETTING SYSTEM

REFERENCE TO RELATED APPLICATION

This application is a continuation of U.S. patent application Ser. No. 11/139,937, filed May 27, 2005, which is a continuation of U.S. patent application Ser. No. 10/780,477, filed Feb. 17, 2004, now U.S. Pat. No. 6,899,324, issued May 31, 2005, which was a continuation of U.S. patent application Ser. No. 10/369,038, filed Feb. 18, 2003, now U.S. Pat. No. 6,712,347 issued Mar. 30, 2004.

BACKGROUND OF THE INVENTION

1. Field of the Invention

The present invention relates to jig systems and more particularly pertains to a new automatic truss jig setting system for setting and resetting jig stops in a highly efficient and effective manner.

2. Description of the Prior Art

Jig systems have been used to hold building elements, such as wood boards, in proper position while the building elements are attached to each other to construct a roof support truss. Known jig systems typically employ a horizontal surface (such as a table) for resting the building elements thereon and a plurality of adjustable stops for indicating the proper positions of the building elements in the desired truss design and for holding the building elements in those positions until the elements can be secured together in a permanent manner. For each different truss design, the stops must be repositioned on the jig surface to reflect the different positions of the building elements. Computer programs have been developed to calculate, for various truss designs, the positions of the stops from a reference line, such as an edge of the table. Conventional practice has been to measure the positions of the stops from the reference line, manually move the stops to the positions, manually secure the stops in the desired positions, place the building elements on the table against the stops, fasten the building elements together, remove the completed truss, and then repeat the process by releasing and then re-securing the stops for each different truss design.

As there can be significant variation between the size and shape of roof support trusses used for the same building, a significant amount of the truss production time has been dedicated to resetting the positions of the stops, especially when only one or two trusses for each truss design are needed. For example, the setup for positioning the stops on the truss jig may take approximately 15 minutes or more, while the time needed to actually construct the truss may be only 3 minutes.

Various approaches have been used to speed up the jig stop set up process, and one approach has been to project an image of the desired truss in actual shape and size on the surface of the jig, which can help minimize the amount of measurement required but does not eliminate the need to repeatedly secure and loosen the stops for each truss design. Further, the projection equipment and associated controlling system tends to be relatively expensive.

Another approach has been to employ a system that automatically moves the stops (sometimes referred to as "pucks") along slots in the horizontal surface of the jig. While in concept these systems can save time otherwise needed to measure, move and secure the stops on the jig, there have been problems that have cropped up with these systems that make them less time saving and reliable as they could be for optimum efficiency.

For example, the environment in which the jig systems are used is filled with debris and dust. Even when the building elements are cut and shaped at a location remote from the jig system, the building elements often carry sawdust and wood chips onto the surface of the table of the jig system. This debris falls or is pushed into the slot in which the puck moves. As each puck is typically mounted on a screw-threaded rod that is positioned below the puck in the slot, the debris often falls onto the rod. Since the rod rotates to move the puck, a rod caked with debris can hamper and even prevent movement of the puck along the rod. Thus, regular and frequent cleaning of the rod is needed to minimize the possibility of breakdowns of the system.

Further complicating this situation is the fact that the screw-threaded rods typically are covered with some type of lubricant to facilitate movement of the puck along the rod, and this often sticky lubricant holds the debris on the surface of the rod. The encrusted rod can carry the debris into the cooperating parts of the system, and cause additional friction and failure.

Still further exacerbating this problem in the known systems is the placement of the rod in a channel located below the slot with a closed bottom that holds the debris in close proximity to the rod, so that infrequent clearing of the channels can bring debris in contact with the rods from the bottom (as well as from the top as debris falls from the table surface).

Still further, the known systems lack a suitable system for dealing with encounters between the puck and an obstruction while the puck is moving to the desired position. Some known systems permit slippage between the driving motor and the rod when resistance in moving the puck is encountered, but the slippage results in the system losing track of the position of the puck on the jig and the system must then be reset in some manner so that the system can reassess the position of the puck on the table and reposition each of the affected pucks to the correct positions. This is particularly a problem in systems that rely upon the precise rotation of the motor (such as a stepper motor) in order to determine the current position of the puck on the jig system. Any slippage between the motor and the rod results in the puck being in a position different from where the system registers the location of the puck.

Thus, while the known systems for automatically positioning the stops on the jig are an improvement over jig systems requiring manual positioning of the stops, there are significant new problems that have arisen with the use of these automatic systems that hamper their operation in a highly efficient and effective manner.

SUMMARY OF THE INVENTION

In view of the foregoing disadvantages inherent in the known types of jig systems known in the prior art, the present invention provides a new automatic truss jig setting system that is highly suitable for setting and resetting jig stops in a highly efficient and effective manner.

To attain this, in one aspect of the invention, the jig setting system comprises a table including a plurality of segments with side edges of adjacent segments defining a slot. A plurality of pin assemblies is movable independently of each other along the slot. Movement apparatus is provided for independently moving the pin assemblies along the slot. Each of the side edges of the segments associated with the slot defines a substantially vertical plane with a zone being defined between the substantially vertical planes of the side edges, and the movement apparatus is located substantially outside of the zone of the slot.

In another aspect of the invention, the jig setting system comprises a table including a plurality of segments with side edges of adjacent segments of the plurality of segments defining a slot. A pin assembly is movable along the slot. Movement means is provided for moving the pin assembly along the slot. The movement means includes rotation means for producing rotational motion, converting means for converting rotational motion into translational motion by the pin assembly, rotation transferring means for transferring rotational motion of the rotation means to the converting means while permitting slippage between the rotation means and the converting means when translational movement of the pin assembly is resisted, and position sensing means for sensing rotation of the converting means to determine a position of the pin assembly along the slot. Sensing of rotation of the converting means by the position sensing means is not affected by any slippage of the rotation transferring means.

An optional aspect of the invention includes detecting means for detecting interference with movement of one of the pin assemblies. The detecting means may comprise means for determining when rotational motion by the rotation means is not transferred to the converting means by the rotation transferring means, means for temporarily delaying for a predetermined time period further actuation of the rotation means when rotational motion by the rotation means is not transferred to the converting means by the rotation transferring means, and means for reinitiating rotational movement of the rotation means when the predetermined time period has passed. The detecting means may also comprise means for canceling further movement of the pin assemblies if, after a preset period of time, attempts to reinitiate rotational movement of the rotation means does not result in rotational motion by the rotation means being transferred to the converting means by the rotation transferring means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the ability to minimize, if not altogether prevent, the buildup of debris on (or in the proximity of) the apparatus for moving the pin assemblies so that frequently cleaning and sudden breakdowns of the apparatus can be avoided. Another significant advantage is the ability of the system to handle situations where one of the pin assemblies is prevented from moving by an obstruction.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
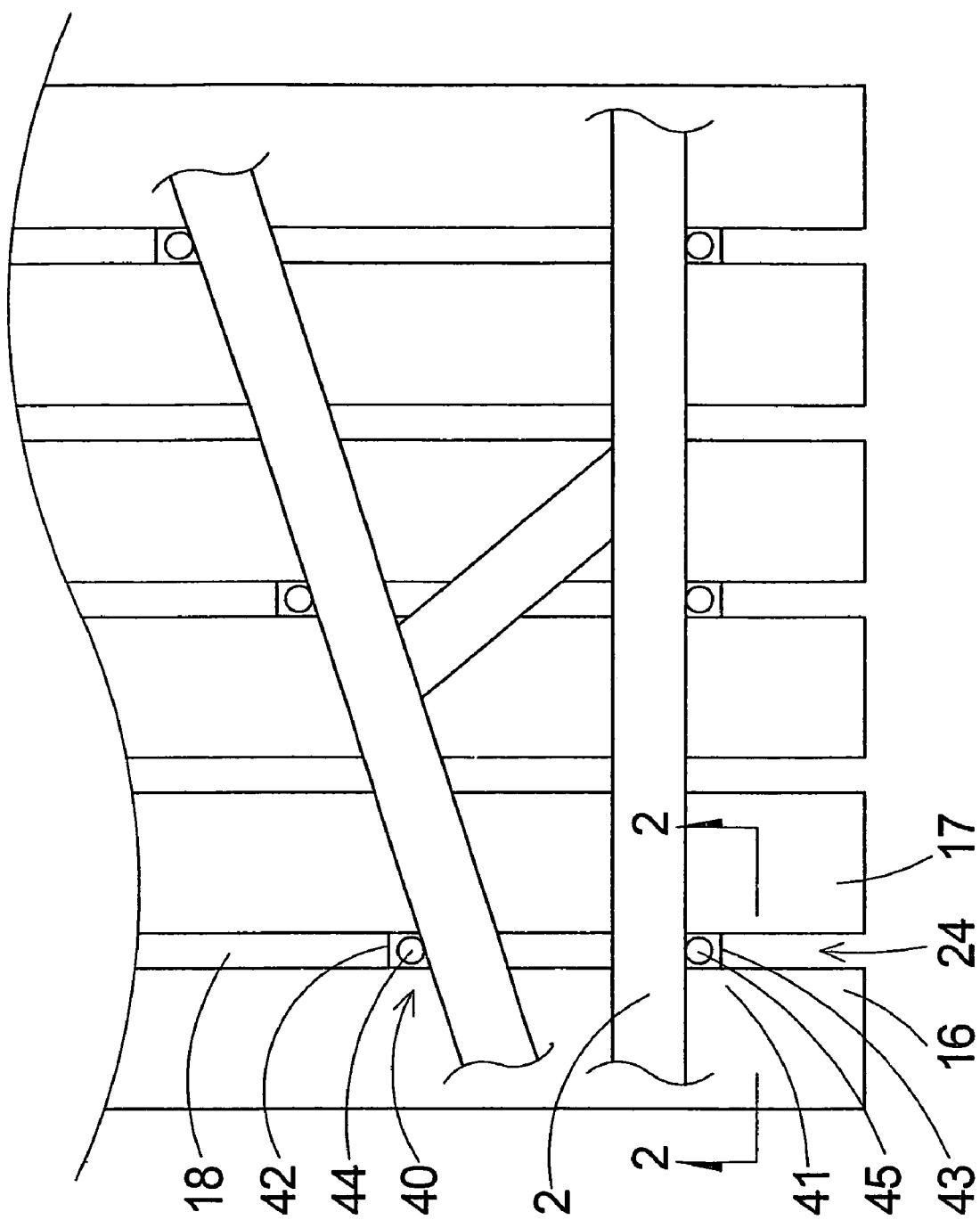
FIG. 1 is a schematic top view of a new automatic truss jig setting system according to the present invention employed on a portion of a jig table.
Figure 2:
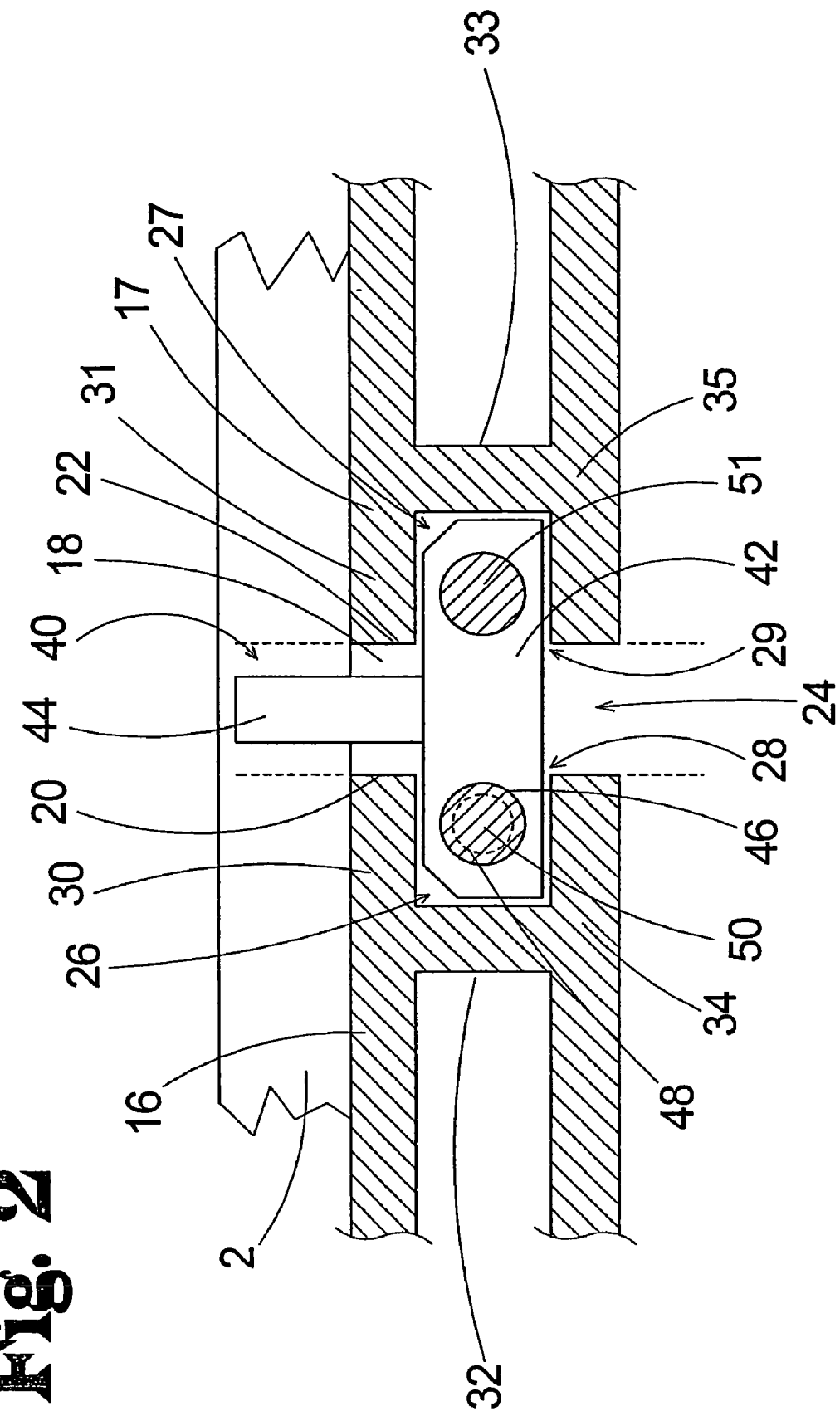
FIG. 2 is a schematic sectional view of the present invention positioned along a slot of the jig table.
Figure 3:
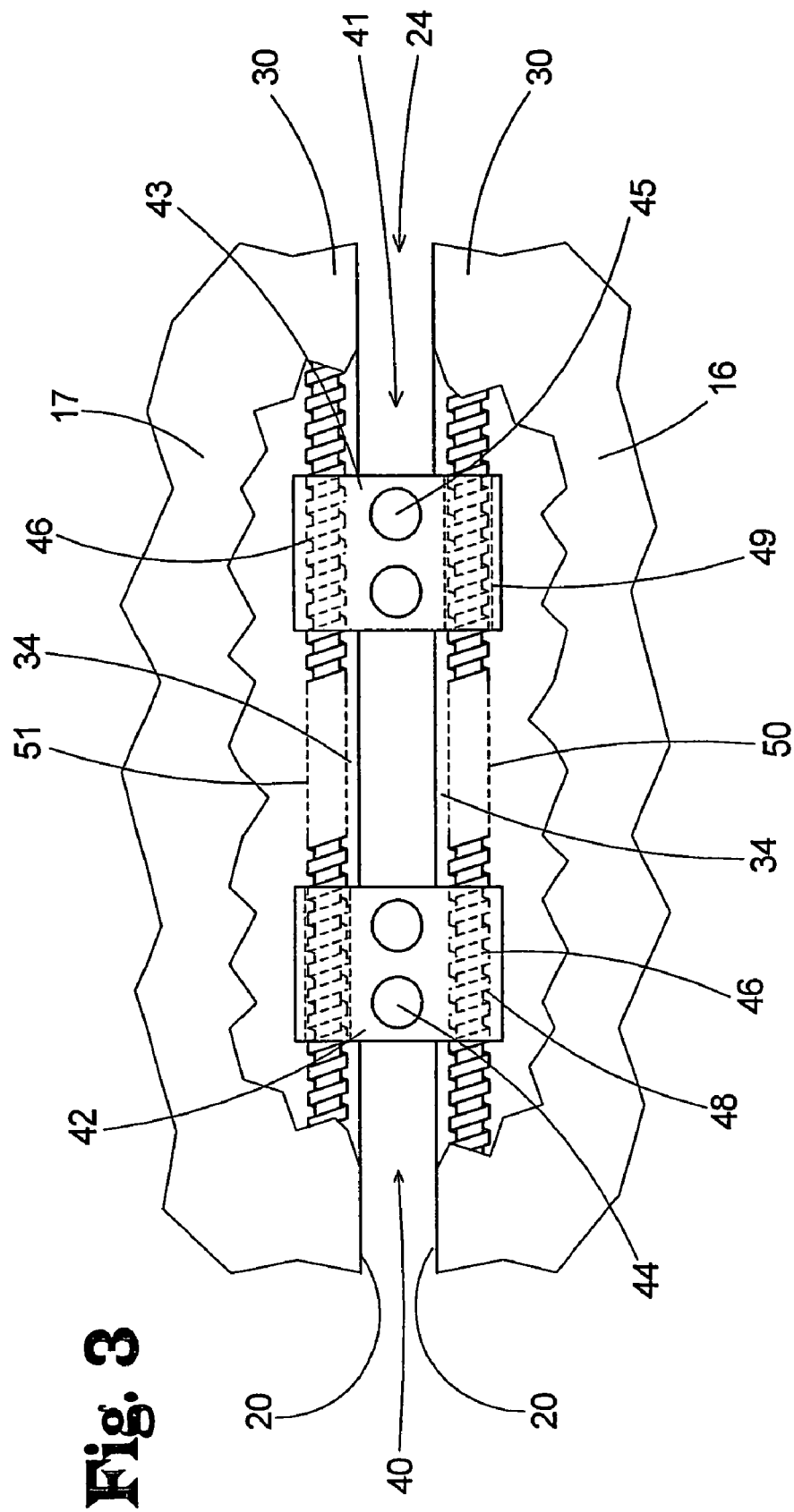
FIG. 3 is a schematic top view of the jig table with portions of the table removed to expose detail of the present invention.

With reference now to the drawings, and in particular to FIGS. 1 through 8 thereof, a new automatic truss jig setting system embodying the principles and concepts of the present invention and generally designated by the reference numeral 10 will be described.

As best illustrated in FIGS. 1 through 8, the truss jig positioning system 10 of the invention may suitably be employed on a table 12 that has and defines a support plane 14 on which work pieces or building elements (such as wood boards or other building materials) are supported in proper position for forming a structure such as a support truss for a roof of a building. The table 12 may comprise a plurality of segments 16 that have upper surfaces 15 that substantially lie in and define the support plane 14 of the table. The upper surface of each of the segments may be substantially planar, and a plane of the segments may be oriented substantially horizontal.

The segments 16 of the table are separated by slots 18, and preferably each of the slots extend substantially parallel to each other on the table. Each of the slots 18 may extend substantially perpendicular to the length of the table, and may extend across, or substantially across, the width of the table. In such a configuration, the slots may be oriented substantially parallel to the rise (or height) dimension of a truss when the truss is rested on the support plane of the table.

Each of the slots 18 may be defined by opposing side edges 20, 22 of adjacent segments 16, 17 of the table. Each of the side edges 20, 22 that are associated with one of the slots may define a substantially vertical plane that extends along the respective side edge. The space between the opposing side edges 20, 22 of adjacent segments 16, 17 may be considered to define a zone 24 that lies between the side edges and extends downwardly from the slot between the segments. In one embodiment of the invention, the zone 24 is substantially free of structure that would catch debris falling from the table 12 through the slot 18 and hold the debris close to the slot (and the movement means described below) so that the debris collects and can affect and degrade the performance of the movement means. It should be recognized that in such an embodiment of the invention, various structural elements may cross the zone, but no wall or plate extends across the zone 24 proximate to the movement means.

A side channel 26, 27 may be provided that opens into the slot 18 from below each of the segments 16, 17. Each of the side channels has an opening 28, 29 that lies adjacent the zone 24. The opening 28, 29 may lie in a plane, and the plane of each of the openings may be substantially vertically oriented. Each of the side channels 26, 27 may include an upper portion 30, an intermediate portion 32, and a lower portion 34. The upper portion 30 may extend at least a portion of the distance between adjacent slots 16, 17 in the table 12. The upper portion 30 may comprise a plate member, or a portion thereof, that extends in a substantially horizontal plane and forms the segment 16, 17. The intermediate portion 32 may support the upper portion, and may comprise a plate member that extends in a substantially vertical plane. The intermediate portion 32 may be positioned substantially opposite of the opening 28, 29 of the respective side channel 26, 27. The lower portion 34 may be positioned below the upper portion 30, with the intermediate portion 32 extending between the lower portion and the upper portion 30. The lower portion 34 may comprise a plate member that extends in a substantially horizontal plane. The upper 30, intermediate 32, and lower 34 portions may thus collectively define the side channel, with the upper portion forming a top wall of the side channel, the intermediate portion forming a back wall of the side channel, and the lower portion forming the bottom wall of the side channel. The opening 28, 29 of the side channel 26, 27 may extend between the top and bottom walls.

The system 10 of the invention includes a pin assembly 40 that is movable along one of the slots 18 in the table 12. In one highly preferred embodiment of the invention, a pair of pin assemblies 40, 41 are independently movable in a slot 18. Optionally, a plurality of the slots 18 of the table 12 may each have one or more of the pin assemblies associated therewith. Each of the slots of the table may have pin assemblies, or the pin assemblies may be associated only with every other slot, or every third or fourth slot of the table, for example.

The pin assembly 40 of the invention may include a pin carriage 42 that is moveable along, and optionally in, the slot 18. The pin carriage 42 may be located at least partially in the zone 24 defined between the adjacent segments 16, 17, and portions of the pin carriage may extend into each of the opposing side channels 26, 27 associated with the slot. The pin assembly 40 may also include a pin 44 that is mounted on the pin carriage 42 and extends through the slot 18 to a level located above the support plane 14. The pin 44 may be substantially cylindrical, and may have a substantially uniform diameter along its length. The pin 44 may also be elongate with a longitudinal axis that extends in a substantially vertical direction. It will be appreciated by those of skill in the art that the pin carriage and the pin may be formed of one piece of material, however, employing separable parts for this assembly permits replacement of damaged pins if needed. Further, the pin carriage may have a plurality of pin mountings so that the pins may be repositioned on the carriage or interchanged when one mounting becomes damaged.

The pin carriage 42 may have a first passage 46 that extends through the pin carriage with an interior surface 48 that may be threaded with a suitable thread for transferring power, such as, for example, an acme or square thread. The pin carriage 42 may also have a second passage 49 that extends through the carriage. In one preferred embodiment of the invention, two of the pin assemblies 40, 41 are associated with each slot 18 of the table 12. The first 46 and second 49 passages may be oriented substantially parallel to each other in the pin carriage 42.

The system 10 of the invention also includes means for moving the pin assembly 40, or more than one of the pin assemblies 40, 41, along the slot 18. The movement means is preferably located in the side channel or channels 26, 27 of the adjacent segment 16, 17 of the table 12, and are preferably located out of the zone 24 associated with the slot 18. As a result, debris falling through the slot 18 is less likely to contact the movement means, and thus interfere with its operation.

In one embodiment of the invention, the movement means includes means for converting the rotational motion into translational motion by the pin assembly, which may include a rod 50 that extends along a portion of the slot 18 of the table. Significantly, the rod 50 is nested in the side channel 26 outside of the zone 24 of the slot, so that debris falling from the support plane of the table downwardly through the slot 18 and into the zone 24 is less likely to land on or otherwise come into contact with the rod, which is thus shielded by the segment of the table. The rod 50 may extend transversely with respect to the longitudinal length of the table.

A first rod 50 may be located in a first one 26 of the side channels and a second rod 51 may be located in a second one 27 of the side channels. The rods are preferably mounted or otherwise supported on the table 12, and may be horizontally spaced to opposite sides of the zone 24 with the rods oriented substantially parallel to each other and rotatable about substantially horizontal axes. Each of the rods 50, 51 may be externally threaded for engaging the threaded interior surface of the first passage 46 of the pin carriage such that rotation of the rod in a first rotational direction causes translation motion of the pin carriage in a first direction along the slot 18 and rotation of the rod in a second rotational direction causes translation motion of the pin carriage in a second direction along the slot 18. The external threads of the rods 50, 51 should be compatible with the internal threads on the pin carriage such that power may be transmitted between the respective rod and pin carriage. The threads should thus be of a type suitable for power transmission, such as, for example, an acme or square thread for power.

The means for moving the pin assemblies may further include rotation means for producing rotational motion to rotate each rod 50. In one embodiment of the invention, the rotational means comprises a motor 52. The motor 52 may be fixedly mounted with respect to the table and positioned at a location beneath the segments of the table, close to one end of the respective rods 50, 51 of a slot 18 being driven by the motor. A motor 52 is provided for each rod 50, 51 such that each motor can be individually actuated to move the associated pin assembly independent of other pin assemblies.

The means for moving the pin assemblies may also include rotation transferring means for transferring the rotational motion of the rotation means, such as the motor 52, to the converting means, such as the rod 50, 51. Significantly, the rotation transferring means permits slippage between the rotation means and the converting means when conversion of rotational to translational movement by the converting means is resisted, such as when the moving pin assembly 40 encounters an obstruction on the upper surface of the table or encounters another moving or stationary pin assembly 41 located in the slot. The rotation transferring means may comprise an endless belt 54 wrapped about a pair of pulleys 56, 57, with a first one 56 of the pulleys being mounted on the motor 52 and a second one 57 of the pulleys being mounted on the rod 50, or being linked to the rod in a manner that does not permit slippage between the second pulley 57 and the rod 50. The belt 54 allows slippage between the pulleys 56, 57 and the belt 54 so that if the rod 50 is unable to turn because the pin assembly 40 has encountered an obstruction, the belt is able to slip with respect to one or both of the pulleys so that the inability to turn the rod 50 does not significantly impede the operation of the motor and the motor overheats or becomes damaged.

In one embodiment of the invention, a driven gear 60 is mounted on the rod 50, and a driver gear 62 is mounted on the second pulley 57. An idler gear 64 may be employed between and be in communication with driver 62 and driven 60 gears for transferring rotation therebetween, while minimizing the size of the driven gear on the rod 50. This structure transfers rotation between the rod 50 and the second pulley 57 so that rotational slippage therebetween is substantially prevented, and thus the rotation of the second pulley accurately represents the rotation of the rod.

The means for moving the pin assemblies may also include a position sensing means for sensing rotation of the converting means without slippage between the position sensing means and the converting means, so that slippage between the rotation means and the converting means does not affect the ability of the position sensing means to accurately sense the position of the pin assembly along the slot. The position sensing means may comprise a position sensor 66 that is mounted on the second pulley 57, or an axle associated with the second pulley. The position sensor 66 is thus able to sense rotation of the rod 50 without the slippage of the belt interfering with or interrupting the detection of the movement of the pin assembly 40.

Figure 4:
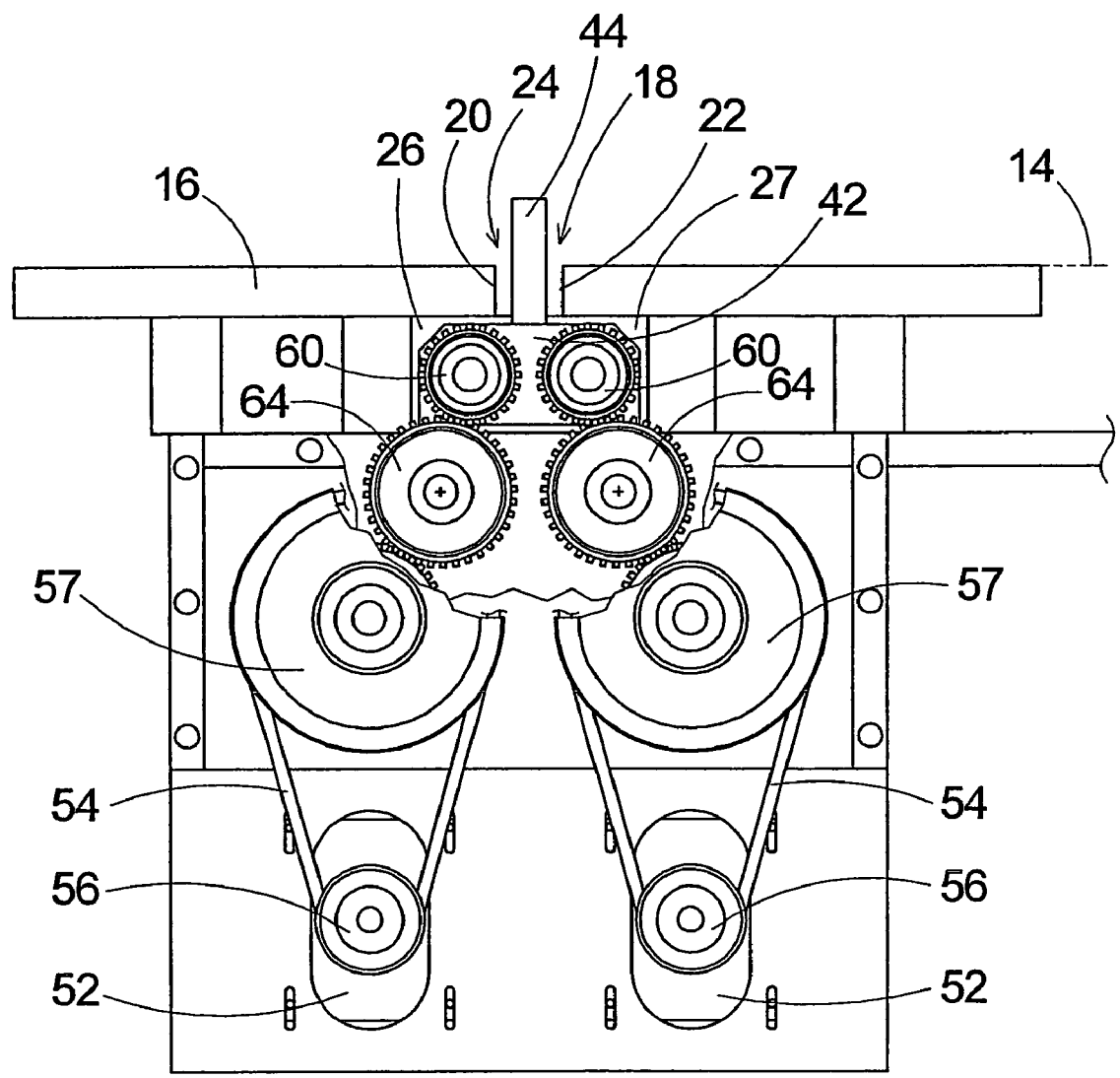
FIG. 4 is a schematic end view of the present invention particularly illustrating the assembly for rotating the rods.
Figure 5:
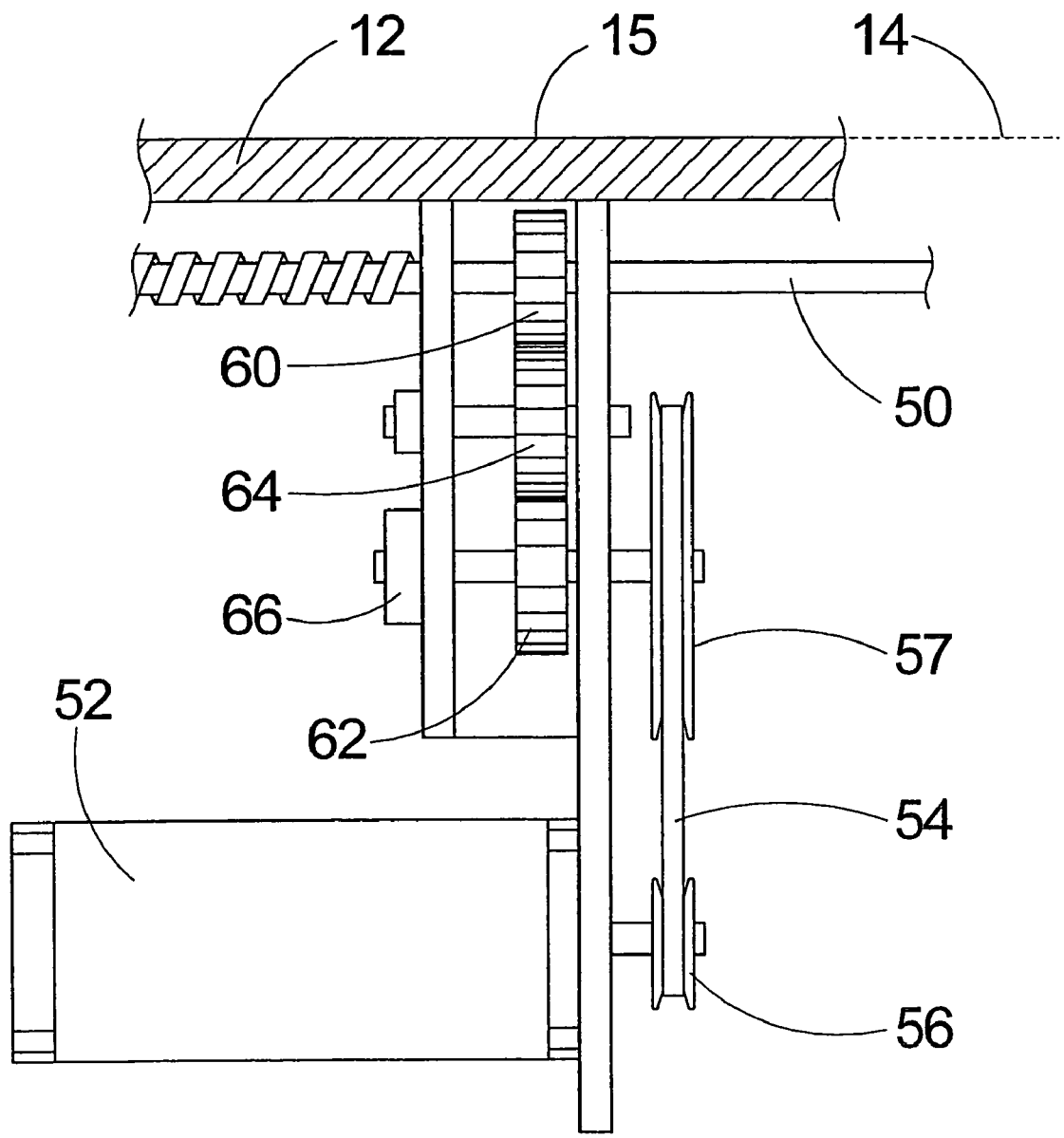
FIG. 5 is a schematic side view of the assembly for rotating the rods.
Figure 6:
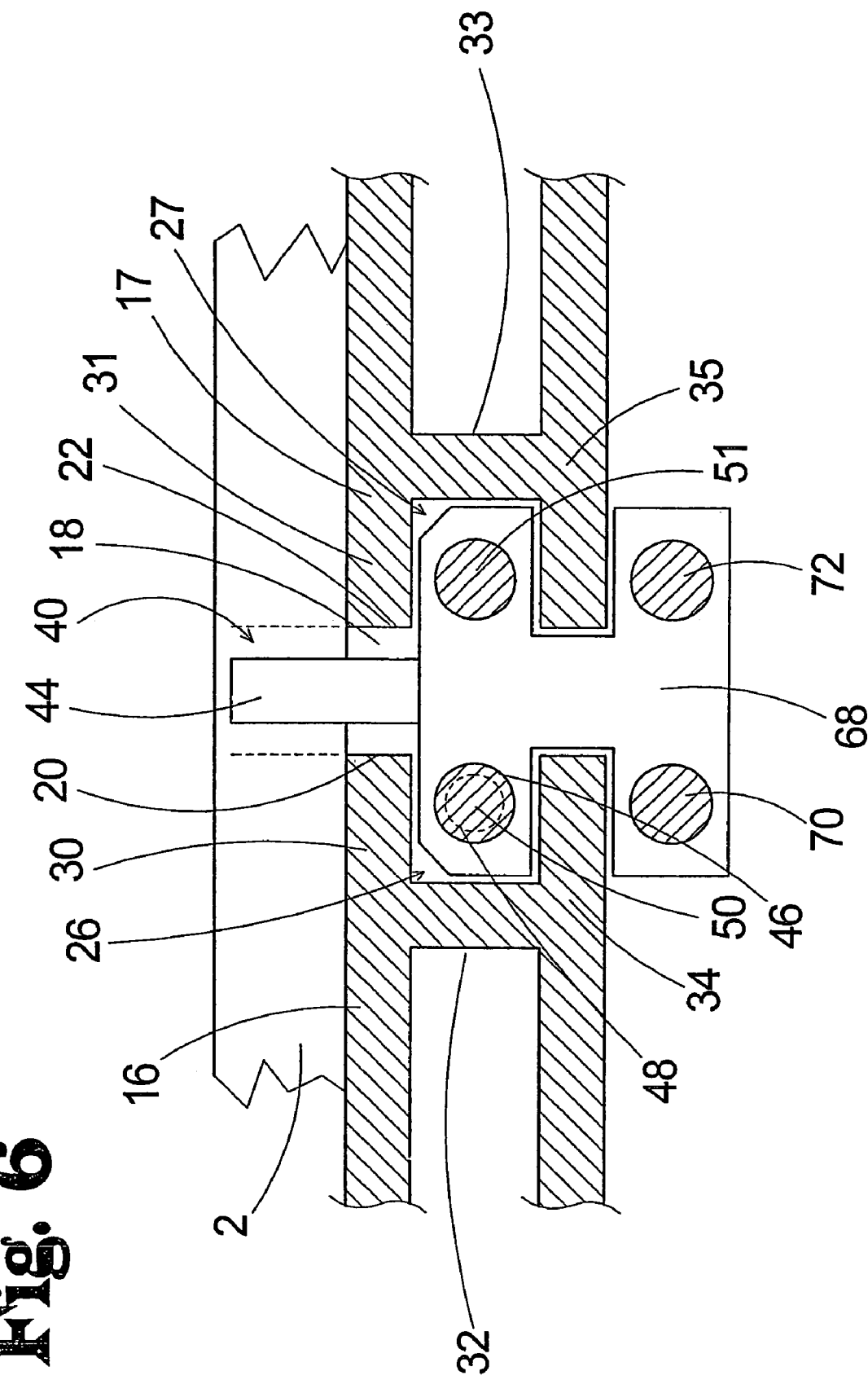
FIG. 6 is a schematic sectional view of an optional configuration of the present invention.
Figure 7:
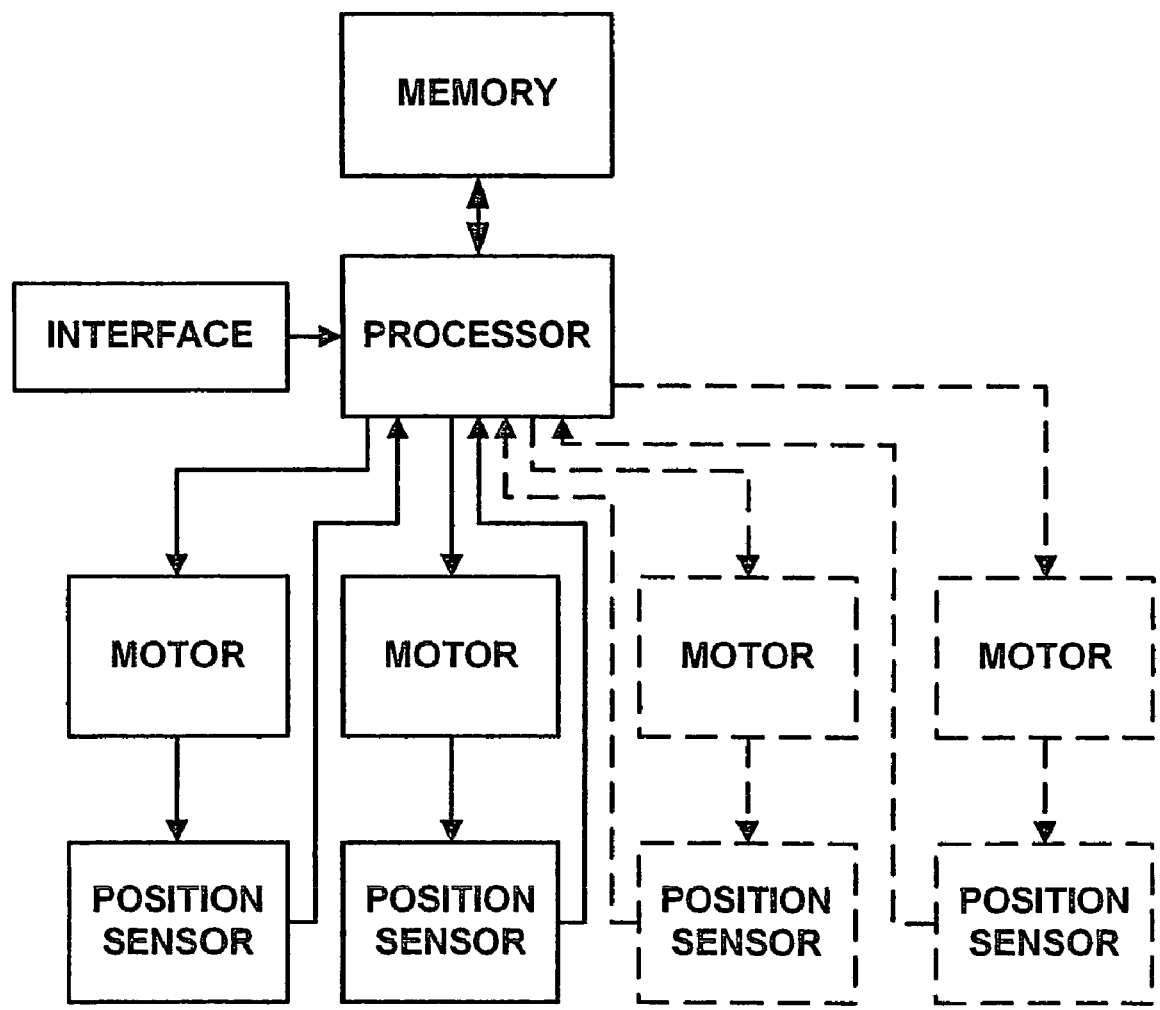
FIG. 7 is a schematic diagram of operational elements of the present invention.
Figure 8:
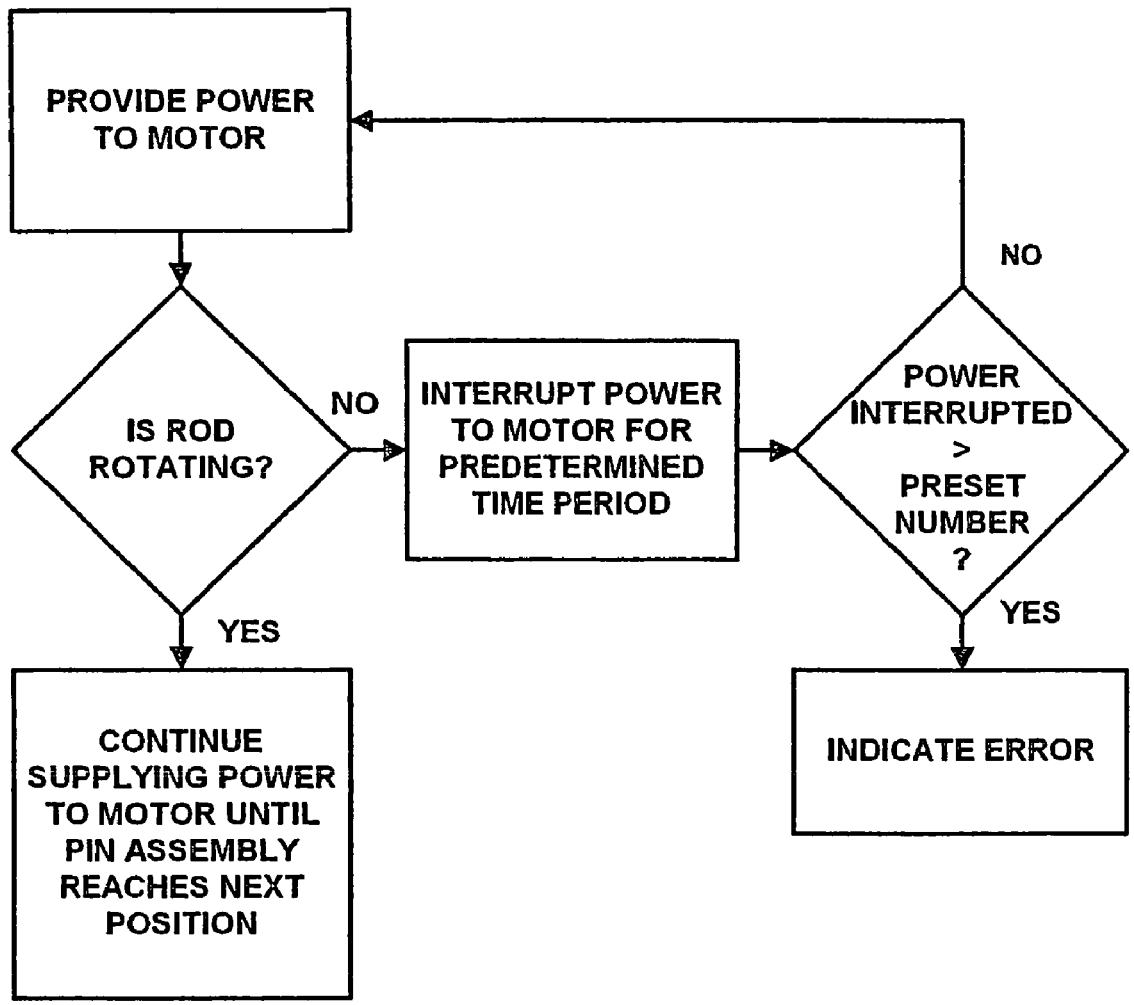
FIG. 8 is a schematic flow chart of an aspect of the operation of the present invention.

The rods 50, 51 of the system are located outside of the zone 24 defined by the slot 18, and a substantial portion of the remainder of the apparatus utilized to move the pin assemblies is also removed from the zone 24. It will be noted that while some insubstantial portions of the apparatus utilized for moving the pin assembly or assemblies may impinge upon the zone 24, these portions of the apparatus are generally located at the ends of the slot 18 and segments 16, 17 (adjacent lateral edges of the table 12) where significantly less debris is likely to fall off of the table through the slot. For example, the apparatus generally shown in FIGS. 4 and 5 is preferably located near an end of the slot 18 where positioning of building elements is less frequent. As a result, debris falling from the table 12 through the slot 18 is much less likely to contact (and perhaps become stuck on) the apparatus for moving the pin assemblies.

The first passage 46 of the pin carriage 42 forms a driver passage such that the rod 50 extending through the first passage is able to drive and move the pin carriage of the pin assembly along the slot. In the illustrative embodiment of the invention, the threaded interior surface 48 of the driver passage engages the threaded exterior of the rod 50 so that rotation of the rod in a first direction causes movement of the pin assembly in one direction and reversing of one of the rods. The second passage 49 of the pin carriage 42 forms a slider passage through which the rod 51 is slidable without rod 52 engaging or affecting the pin carriage engaging. Thus, the first pin assembly 40 is thus moved by the rotation of the first rod 50, while the first pin assembly 40 passes over the second rod 51 without hindering movement of the first pin assembly 40. Conversely, the second pin assembly 41 is moved by the second rod 51 as the second rod 51 passes through the driver passage of the pin carriage 43 of the second pin assembly 41, while the first rod 50 passes through the slider passage of the second pin assembly 41 and is unaffected by the rotation of the first rod 50.

In an optional embodiment of the invention (see FIG. 6), a pin carriage 68 may be employed that includes additional slider passages 70, 72 for the passage of additional rods employed on a modified positioning system. The employment of additional rods with the modified pin carriage 68 permits the movement of more than two pin assemblies along the same common slot, with each of the pin assemblies being driven by its own rod. This embodiment of the invention can be especially suitable for using a pair of the pin assemblies to pinch or otherwise trap a building element therebetween, such as a board, and with four (or optionally more) pin assemblies positioned along a slot, one, two or even more boards may each be secured by a pair of the pin assemblies.

The system of the invention also may include controlling means for controlling the movement of the pin assemblies on the table, sensing the movement of the pin assemblies and monitoring the current positions of the pin assemblies at each set up. Software application programs are generally available from various sources (such as truss hardware vendors) for calculating the positions of the stops on a jig table as measured from a reference line, such as the edge of the table or other mark. Such programs output sets of coordinates that are used to measure from the reference edge of the table to the appropriate position of the stop or stops for each slot. One example of such a truss design application program is sold under the tradename MITEK 2000 JIGSET, available from Mitek Industries, Inc. of Chesterfield, Mo., USA, although it should be understood that other similar programs are available and may be employed. The controlling means of the system 10 may be used to convert the measurements outputted by the application program (which may be in metric or U.S. measurement units or any suitable increment) to an appropriate number of position counts representing intervals of movement by the pin assembly along the slot 18 in the table.

Upon transfer of the pin assembly positional information to the system, the system actuates, or supplies power to, the respective motors to cause movement of the pin assemblies toward the desired positions in the truss jig set up. The position sensors detect and count the movement of the rods, and when the associated position sensors detect that the number of position counts counted correspond to the final position of the pin assembly in the set up, the respective motors are deactuated by ceasing the supply of power to the motors. In one implementation of the invention, the movement of the pin assemblies may be performed at more than one speed, with the, for example, the pin assembly being moved at a first, relatively higher speed at initial movement and then being moved at a second, relatively lower speed as the pin assembly approaches the desired position.

If, during the movement of the pin assemblies, one of the pin assemblies encounters an obstruction on the table and the movement of the pin assembly to the desired position along the slot is prevented, the rod will stop turning and the second pulley will also stop turning as a result of the non-slipping linkage between the rod and the second pulley. As the position sensor is associated with the second pulley, any stoppage of the movement of the rod results in the ceasing of the detection of further counts. However, the motor may continue to turn, and the belt may slip on the first and second pulleys, since the position sensor has not detected that the pin assembly has reached the desired position. If the system detects that the supply of power to the motor does not result in a change in the count by the position sensor (see FIG. 8), then the system interrupts power to the motor for a predetermined time period, and then re-supplies power to the motor. If again the actuation of the motor does not result in the advance of the count by the position sensor, the system again removes power from the motor. This may be repeated over a preset period of time, or optionally for a preset number of times, and then the system may signal an error and cease supplying power to the motor until the system is reset. In one illustrative implementation of the invention, the system pulses power to the motor on a 25% duty cycle for a period of approximately 40 seconds, and waits for a count to be returned by the position sensor. This procedure may be executed by a programmable logic control or processor.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A truss jig positioning system comprising:
   a table having a support plane on which work pieces are supported, the table comprising a plurality of segments, side edges of adjacent segments of the plurality of segments defining a slot;
   at least one pin assembly movable along the slot;
   movement means for moving the at least one pin assembly along the slot;
   wherein each of the side edges of the segments of the table associated with the slot defines a substantially vertical plane with a zone being defined between the substantially vertical planes of the side edges, the movement means being located substantially outside of the zone of the slot; and
   a side channel formed below each of the side edges of the adjacent segments, the movement means being located in at least one of the side channels of the adjacent segments of the table.

2. The system of claim 1 wherein the movement means comprises at least one rod being nested in one of the side channels of the adjacent segments outside of the zone.

3. A truss jig positioning system comprising:
   a table having a support plane on which work pieces are supported, the table comprising a plurality of segments, side edges of adjacent segments of the plurality of segments defining a slot;
   at least one pin assembly movable along the slot;
   movement means for moving the at least one pin assembly along the slot;
   wherein each of the side edges of the segments of the table associated with the slot defines a substantially vertical plane with a zone being defined between the substantially vertical planes of the side edges, the movement means being located substantially outside of the zone of the slot; and
   wherein the movement means comprises:
      rotation means for producing rotational motion;
      converting means for converting rotational motion into translational motion by the pin assembly; and
      rotation transferring means for transferring rotational motion of the rotation means to the converting means, the rotation transferring means permitting slippage between the rotation means and the converting means when translational movement of the at least one pin assembly is resisted.

4. The system of claim 3 additionally comprising a position sensing means for sensing rotation of the converting means to determine a position of the at least one pin assembly along the slot, wherein the sensing of rotation by the position sensing means is not affected by any slippage of the rotation transferring means.

5. A truss jig positioning system comprising:
   a table having a support plane on which work pieces are supported, the table comprising a plurality of segments, side edges of adjacent segments of the plurality of segments defining a slot;
   at least one pin assembly movable along the slot;
   movement means for moving the at least one pin assembly along the slot;
   wherein each of the side edges of the segments of the table associated with the slot defines a substantially vertical plane with a zone being defined between the substantially vertical planes of the side edges, the movement means being located substantially outside of the zone of the slot; and
   wherein the movement means comprises:
      a rod operatively coupled to the at least one pin assembly;
      a motor;
      a driver pulley mounted on the motor for being rotated by the motor;
      a driven pulley;
      a belt connecting the driven pulley to the driver pulley for transferring rotation of the driver pulley to the driven pulley in a manner permitting rotational slippage between the belt and one of the pulleys if rotation of the driven pulley is resisted;
      means for operatively coupling the driven pulley to the rod in a manner preventing rotational slippage between the driven pulley and the rod such that rotation of the driven pulley directly corresponds to rotation of the rod; and
      a position sensor operatively connected to the driven pulley for sensing rotation of the driven pulley and thereby sensing rotation of the rod.

6. A truss jig positioning system comprising:
   a table having a support plane on which work pieces are supported, the table comprising a plurality of segments, side edges of adjacent segments of the plurality of segments defining a slot;
   at least one pin assembly movable along the slot;
   movement means for moving the at least one pin assembly along the slot;

wherein each of the side edges of the segments of the table associated with the slot defines a substantially vertical plane with a zone being defined between the substantially vertical planes of the side edges, the movement means being located substantially outside of the zone of the slot; and wherein the movement means comprises a rod having a threaded exterior surface; and wherein the at least one pin assembly comprises:
   a pin carriage moveable along the slot;
   a pin mounted on the pin carriage and extending through the slot above the support plane;
   a first passage extending through the pin carriage with the first rod passing through the first passage, the first passage having an interior surface adapted to engage the threaded exterior surface of the first rod such that rotation of the first rod produces movement of the pin carriage; and
   a second passage through the pin carriage with an interior surface that is adapted to permit free movement of the second rod through the second passage when the first rod causes movement of the pin carriage.

7. A truss jig positioning system comprising:
a table having a support plane on which work pieces are supported, the table comprising a plurality of segments, side edges of adjacent segments of the plurality of segments defining a slot;
at least one pin assembly movable along the slot;
a threaded rod for moving the at least one pin assembly along the slot;
wherein each of the side edges of the segments of the table associated with the slot defines a substantially vertical plane with a zone being defined between the substantially vertical planes of the side edges, the threaded rod being located substantially outside of the zone of the slot; and
a side channel formed below at least one of the side edges of the adjacent segments, the threaded rod being located in the side channel.

8. The system of claim 7 wherein the threaded rod is nested in the side channel outside of the zone.

9. A truss jig positioning system comprising:
a table having a support plane on which work pieces are supported, the table comprising a plurality of segments, side edges of adjacent segments of the plurality of segments defining a slot;
at least one pin assembly movable along the slot;
a threaded rod for moving the at least one pin assembly along the slot;
wherein each of the side edges of the segments of the table associated with the slot defines a substantially vertical plane with a zone being defined between the substantially vertical planes of the side edges, the threaded rod being located substantially outside of the zone of the slot; and
a position sensing means for sensing rotation of the threaded rod to determine a position of the at least one pin assembly along the slot.

10. A truss jig positioning system comprising:
a table having a support plane on which work pieces are supported, the table comprising a plurality of segments, side edges of adjacent segments of the plurality of segments defining a slot;
at least one pin assembly movable along the slot; and
a threaded rod for moving the at least one pin assembly along the slot;

wherein each of the side edges of the segments of the table associated with the slot defines a substantially vertical plane with a zone being defined between the substantially vertical planes of the side edges, the threaded rod being located substantially outside of the zone of the slot;
a motor;
a driver pulley mounted on the motor for being rotated by the motor;
a driven pulley mounted on the threaded rod; and
a belt connecting the driven pulley to the driver pulley for transferring rotation of the driver pulley to the driven pulley in a manner permitting rotational slippage between the belt and one of the pulleys if rotation of the driven pulley is resisted.

11. The system of claim 10 additionally comprising:
a position sensor operatively connected to the driven pulley for sensing rotation of the driven pulley and thereby sensing rotation of the rod.

12. A truss jig positioning system for use on a table including at least a pair of adjacent segments with a slot defined by adjacent side edges of the pair of adjacent segments, the table having a support plane on which work pieces are supported, each of the side edges of the segments of the table associated with the slot defining a substantially vertical plane with a zone being defined between the substantially vertical planes of the side edges, the system comprising
   at least one pin assembly mountable on the table adjacent to a slot between the pair of adjacent segments with a portion of the at least one pin assembly extending through the same slot;
   movement means for moving the at least one pin assembly along the same slot;
   wherein the movement means is configured in a manner such that, when the movement means is mounted on the table, the movement means is located substantially outside of the zone of the slot; and
   a side channel-defining structure for mounting on the table below one of the side edges of the adjacent segments, the movement means being located in the side channel of the segment of the table.

13. A truss jig positioning system for use on a table including at least a pair of adjacent segments with a slot defined by adjacent side edges of the pair of adjacent segments, the table having a support plane on which work pieces are supported, each of the side edges of the segments of the table associated with the slot defining a substantially vertical plane with a zone being defined between the substantially vertical planes of the side edges, the system comprising
   at least one pin assembly mountable on the table adjacent to a slot between the pair of adjacent segments with a portion of the at least one pin assembly extending through the same slot;
   movement means for moving the at least one pin assembly along the same slot;
   wherein the movement means is configured in a manner such that, when the movement means is mounted on the table, the movement means is located substantially outside of the zone of the slot; and
   wherein the movement means includes detecting means for detecting interference with movement of the at least one pin assembly.

* * * * *